Oct. 14, 1958 A. E. BREWSTER 2,856,528
RELAXATION OSCILLATORS AND ELECTRONIC COUNTERS
Filed June 1, 1954 4 Sheets-Sheet 1
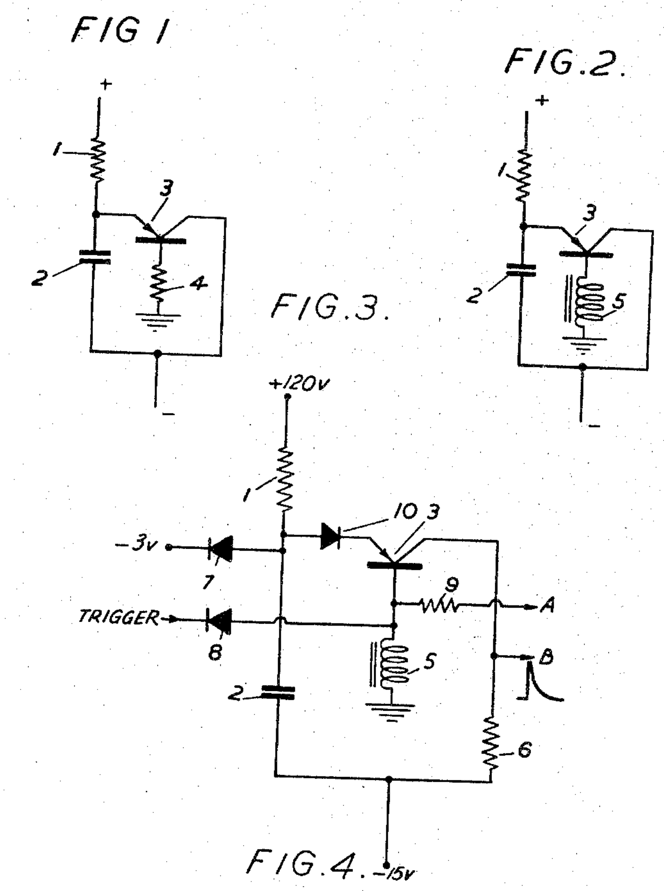
FIG 1, FIG. 2, FIG. 3, FIG. 4
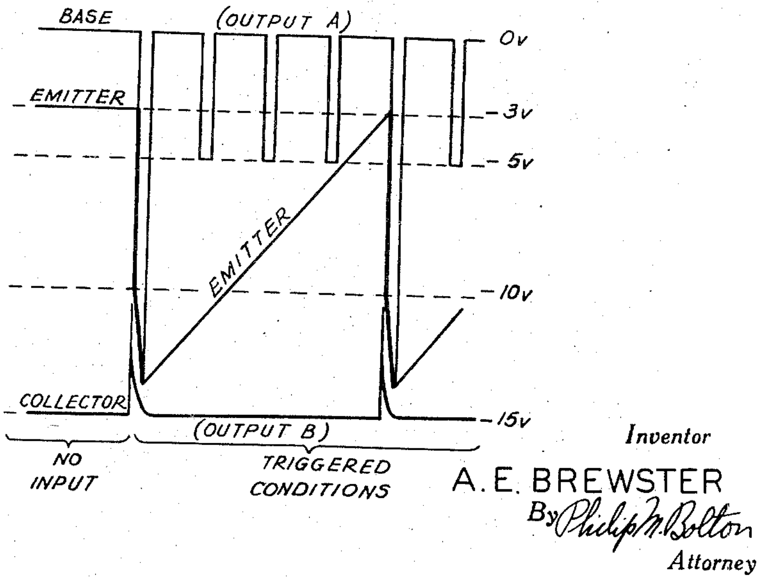
Inventor
A. E. BREWSTER
By Philip M. Bolton
Attorney Oct. 14, 1958 A. E. BREWSTER 2,856,528

RELAXATION OSCILLATORS AND ELECTRONIC COUNTERS

Filed June 1, 1954 4 Sheets-Sheet 2

Inventor
A. E. BREWSTER
By Philip M. Bolton
Attorney

Inventor
A. E. BREWSTER
By Philip M. Bolton
Attorney

EMITTER WAVEFORM (÷3)

BASE WAVEFORM

COLLECTOR WAVEFORM

Inventor
A. E. BREWSTER
By Philip M. Bolton
Attorney

United States Patent Office 2,856,528

Patented Oct. 14, 1958

2,856,528

RELAXATION OSCILLATORS AND ELECTRONIC COUNTERS

Arthur Edward Brewster, London, England, assignor to International Standard Electric Corporation, New York, N. Y., a corporation of Delaware Application June 1, 1954, Serial No. 433,397

Claims priority, application Great Britain June 10, 1953

11 Claims. (Cl. 250—36)

This invention relates to relaxation oscillators and electronic counters, with particular reference to such circuits based on the use of crystal triode amplifiers.

According to the invention there is provided a relaxation oscillator which comprises a crystal triode amplifier having a base electrode, an emitter and a collector, in which the base is grounded through a low resistance high impedance inductive reactance, and in which the frequency of pulsation is determined substantially wholly by frequency determining elements connected to the emitter.

The invention also provides a frequency divider or counter employing cascaded arrangements of such oscillators.

An object of the invention is to provide an improved counter employing such a crystal oscillator, which will have greater independence of crystal characteristics than known circuits of similar type, and which may be used as a pulse frequency divider for applications in which an accurate time-scale is required.

A further advantage arising from the improved arrangements is the provision of an output pulse (or series of pulses) of very short duration and high current amplitude into a low impedance.

With the equipment described an output pulse having an amplitude substantially equal to the crystal triode collector supply voltage, and having the input pulses superimposed at a lower amplitude, may be obtained, and by cascading a number of such circuits the major time intervals on a time-scale may be divided and subdivided, as required, by a suitable choice of counting rates. Such a combination, driven from a frequency-stabilised source, represents a compact unit of very low power consumption, which may be made an accessory to equipment involving cathode ray tube display, e. g. ranging devices, where its ruler-like calibrations would add considerably to ease of operation.

In an alternative counting arrangement also to be described, the counter stages are triggered successively from the collector output waveform of a previous similar stage, providing thereby an output which is free from residual input pulses and effecting a reduction in the required number of circuit components. The alternative arrangement may be preferred in applications not requiring the "ruler-like" output of the first arrangement.

The invention will now be described with reference to the accompanying drawing illustrating various embodiments.

In the drawing:

Fig. 1 shows a typical relaxation oscillator circuit employing a crystal triode;

Fig. 2 shows a modification of Fig. 1, in which an inductance is substituted for the base resistor;

Fig. 3 shows the development of Fig. 2 into a typical single stage for a counter, while Fig. 4 shows waveforms encounterd in the equipment of Fig. 3;

Fig. 5 shows a multi-stage crystal triode counter, coupled base-to-base, while

Figure 5:
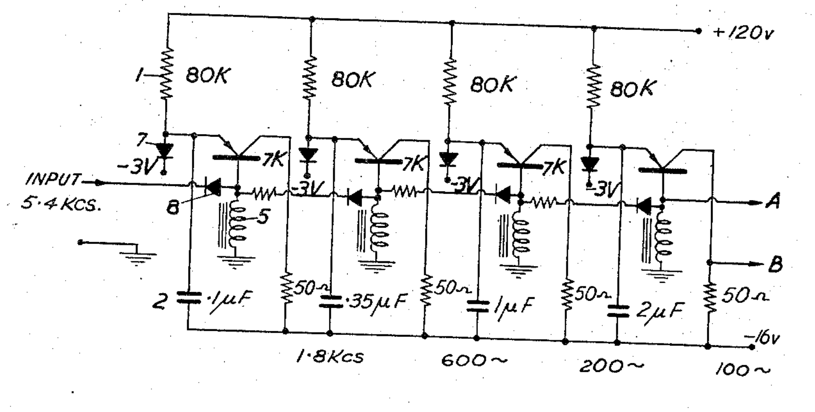

The terminology and technique of using crystal triodes as circuit elements are by now sufficiently well-known to require no detailed exposition. Suffice it to say that a crystal triode comprises a plate of suitable crystalline material with a base electrode, shown in the figures as a horizontal bar, an input electrode known as an "emitter" and shown as an arrow pointing inwards to the top of the base, and an output electrode known as a "collector" and shown as emerging from the point of the arrow, the electrodes being connected to suitable battery supplies.

In Fig. 1, there is shown a typical relaxation oscillator circuit using a crystal triode in which a capacitor 2, connected between the emitter of the triode 3 and the negative supply voltage is allowed to charge through resistor 1 from a positive supply voltage. The triode base is grounded via a resistor 4. When the capacitor has reached a level of charge such that the emitter is carried positive in relation to the base potential, current flows in the emitter circuit. Assuming a current gain in the crystal triode greater than one, the resulting collector current in the resistor 4 will cause the base to become negative, with consequent increase in emitter current. The action is therefore cumulative, and the base quickly approaches the negative supply potential. Since emitter current is drawn from the capacitor 2, this capacitor is rapidly discharged, the emitter thus following the base towards the negative supply potential. When no further current can be supplied to the emitter from the capacitor 2, all current in the resistor 4 ceases, the base returns rapidly towards ground and the charging cycle recommences.

It is desirable that the resistor 4 should have as high a value as possible.

In practice, however, use of the above circuit as a counter is limited by its susceptibility to variation of crystal triode characteristics. In particular it will be seen that the value of standing collector current $I_{co}$ through the resistor 4 will determine the potential to which the base returns on completion of the discharge cycle. This in turn establishes the duration of the charging cycle. Since $I_{co}$ varies, from one triode to another, between wide limits, this effect, aggravated by the need for a high value for resistor 4, makes the counting rate indeterminate.

The proposed improvement shown in Fig. 2 is effected by the substitution of an inductance 5 for the resistor 4. Now, with the emitter cut off, the low value of D. C. resistance of the inductance 5 ensures that the base potential departs negligibly from zero, even when $I_{co}$ has a high value. The upper plate of the capacitor 2, carrying the emitter, must always rise, therefore, to approximately earth potential before emitter current can flow and initiate the discharging cycle. At this point collector current attempts to increase through the inductance 5, developing a back E. M. F. across the inductance which carries the base rapidly downwards to the potential of the negative supply. The crystal triode is thus fully turned on and the capacitor 2 discharges rapidly through the emitter-collector circuit, giving a very high rate of flyback. The cycle then recommences.

Variations in emitter-collector "on" impedance from one triode to another will alter the rate of flyback, but since the flyback time is a very small proportion of the time taken by a complete operating cycle the effect of such variations is generally found to be negligible. However, certain crystal triodes having a very low emitter-collector "on" impedance will pass excessive discharge currents, and in the circuit of Fig. 2 such triodes are self-destructive. The addition of a small resistor 6, Fig. 3, in the collector circuit, ensures that the discharge current cannot exceed a nominal, safe value, and the above mentioned difficulty is thus overcome.

These high level current pulses provide output B, Fig. 3, the actual waveform being shown at the foot of Fig. 4.

Fig. 3 shows a typical single counting stage. A "catching diode" 7 limits the positive excursion of the emitter at a level negative of ground, and in the absence of triggering pulses the circuit remains cut off and quiescent. Application of negative going pulses to the base through a diode 8, having an amplitude exceeding the value of emitter bias, will initiate the operating cycle, Fig. 4. Here it will be seen that a train of such negative pulses, having a repetition rate approximating to *n* times the natural frequency of oscillation, will hold the circuit in synchronism, an output pulse coinciding exactly with every *n*th input pulse.

Since the charging cycle always commences at a point very close to the negative supply potential the actual value of *n* is determined by the values of the capacitor 2 and the resistor 1, by the positive and negative supply potentials, and by the amplitude of the incoming trigger pulses. Variation in the supply potentials will not affect the counting rate provided that a given percentage variation in either supply is accompanied by an equivalent percentage variation in the other.

For example, if both potentials are derived from the same supply (e. g. A. C. mains) fluctuations in this supply will not affect the counting rate. The tolerable percentage variation in trigger pulse amplitude, for a given value of *n*, is a maximum when triggering occurs at a point very near to the natural upper limit of emitter potential, and is roughly proportional to $1/n$ since the rise of emitter potential is substantially linear over the working range. The requirement is that, while the *n*th pulse must have sufficient amplitude to trigger the circuit, the $(n-1)$th pulse must not. Given an input which is within these limits, the counting rate becomes proportional to the product CR, and is independent of the actual inductance value of 5, which functions purely as a choke, i. e. a low resistance inductive reactance. Hence the output waveform A (Fig. 4) of such a stage, after some attenuation, is inherently suitable for triggering a subsequent stage, being of constant amplitude, correct polarity, and correctly related in potential to ground. The resistor 9, Fig. 3, serves to provide the required attenuation.

Crystal triodes having abnormally low emitter back impedance may affect the charging rate by modifying the effective value of the charging resistance 1. By ensuring that the resistor 1 does not exceed 100K ohms, this effect is overcome for the majority of triodes. Alternatively, as is known, the emitter back impedance may be augmented by the back impedance of a diode 10.

Figure 6:
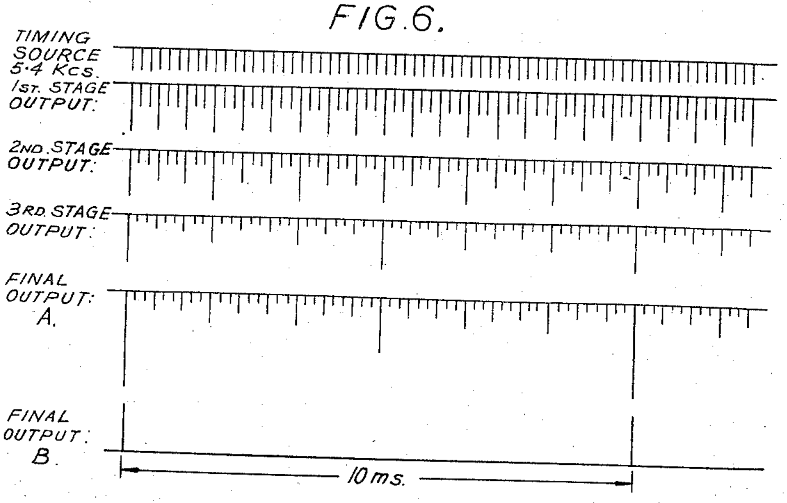
Fig. 6 illustrates the time divisions effected in the various stages of Fig. 5.

A typical multi-stage counter, or frequency-divider, using a basic relaxation oscillator of this type is shown in Fig. 5. The interconnections of the several stages are made base-to-base, and the operation becomes self-evident with reference to the frequency values shown at each stage, and the frequency-division chart of Fig. 6.

It has been found that a circuit of this type with a counting rate (or division factor) of 5 per stage has operated reliably for a long period of time, and that crystal triodes with fairly wide differences in characteristics will count correctly in the circuit without adjustment.

The remaining figures illustrate an alternative circuit arrangement which, for some purposes, has advantages over that just described.

Turning again to Fig. 3 for a moment, this shows the basic circuit of the previous arrangement in which the negative going trigger pulses applied to the crystal triode base initiate a timing cycle determined by values of C and R such that the circuit responds to every *n*th trigger pulse, giving output pulses at collector and base which have a repetition rate equal to $1/n$th that of the trigger pulses.

Since the leading edge of the base output pulse corresponds in shape with the exponential decay of potential across the capacitor C during discharge, the rise time of the pulse is related to the complete cycle time of the stage, although small compared with it. When many such stages are used in cascade, however, the rise time of the final output pulse may become a substantial percentage of the interval between successive input pulses, with consequent uncertainty in timing.

The collector output is not subject to this limitation, having a rise time of less than a microsecond irrespective of the cycle time of the circuit. The decay time of the pulse is still determined by the discharge time constant, but this effect is unimportant and may be eliminated if desired, by a method to be described.

This factor, coupled with the ability of the circuit to deliver large currents into the collector load, makes it desirable to use the collector output whenever possible. The circuit of Fig. 7 has therefore been designed to this end.

Figure 9:
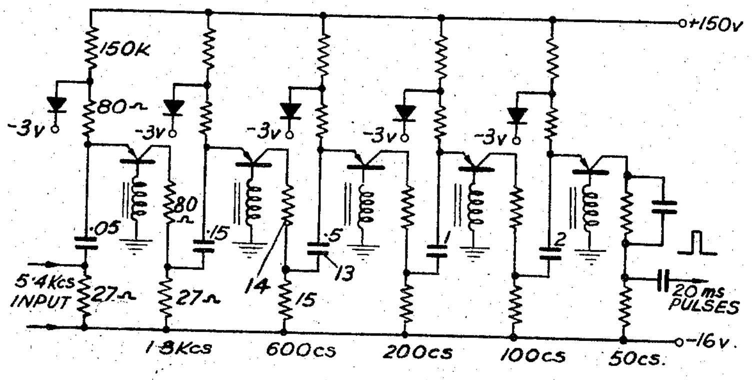
Fig. 9 shows a counter using the crystal triode stage of Fig. 7 as a basis, and designed to produce 20 ms. spaced pulses.
Figure 8A:
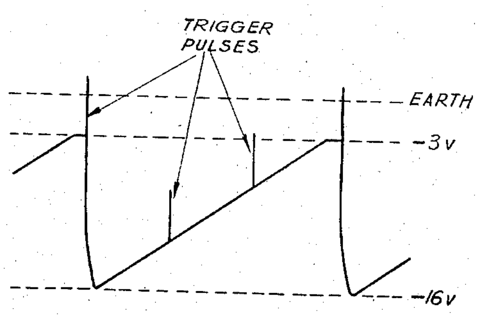
Fig. 8 shows the various waveforms encountered in the arrangement of Fig. 7.
Figure 8B:
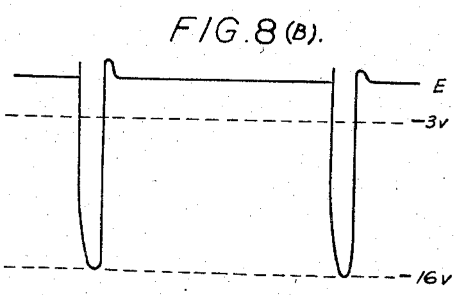
Figure 8C:
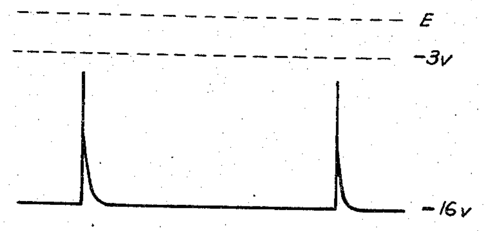

Operation is as described for the earlier circuit, except that positive-going input pulses, derived from the collector output of a previous stage, are developed across a low resistor 11. The capacitor 1 presents a low impedance to these pulses, which become superimposed on the sawtooth emitter waveform Fig. 8 (*a*). A resistor 12 allows the emitter to be driven positive of the catching potential (—3 v.) when diode 7 is conducting. At this time the emitter is carried positive of the base by a trigger pulse, emitter current flows and the discharge cycle commences. The full voltage across the capacitor appears momentarily across the collector load impedance (resistors 14, 15) immediately decaying exponentially over the discharge cycle, Fig. 8 (*c*). A suitable proportion of this voltage is developed across resistor 15 to provide drive for a subsequent stage. In practice resistor 15 serves also as resistor 11 for the following stage (see Fig. 9).

In the case of a stage having a cycle time of 20 milliseconds the collector output pulse retains measurable amplitude after 200 microseconds. In cases where it may be desirable that the trailing edge should fall more rapidly, a capacitor 13 (Fig. 7) may be added and resistors 14 and 15 suitably proportioned. Here the output pulse amplitude rises, or triggering, to a maximum within 1 microsecond as before, but the decay time is now determined by the time constant of the capacitor 13 and resistor 15. Typically, in the circuit of Fig. 9 pulses generated at 20 millisecond intervals are given an effective length of approximately 10 microseconds.

Figure 7:
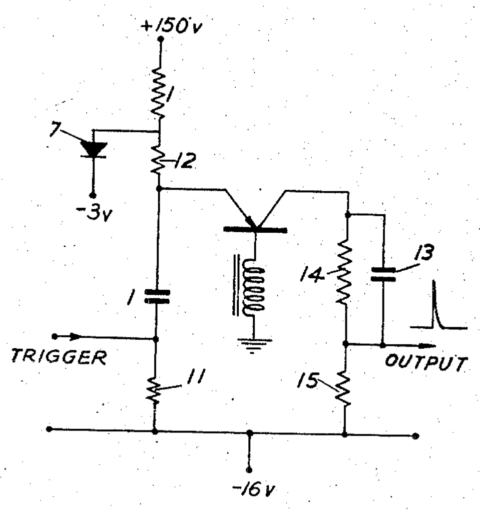
Fig. 7 shows an alternative version of Fig. 3, using collector-emitter coupling.

The circuit of this divider is in accordance with the basic circuit of Fig. 7, and shows the collector-to-emitter coupling via resistors like 14 and 15, the condenser 13, however, being provided only in the output stage. If intermediate outputs were required it could, of course, be used for pulse-shaping of such outputs.

While the principles of the invention have been described above in connection with specific embodiments, and particular modifications thereof, it is to be clearly understood that this description is made only by way of example and not as a limitation on the scope of the invention.

What we claim is:

1. A relaxation oscillator which comprises a crystal triode amplifier having a base electrode, an emitter and a collector, the base electrode being grounded through a low resistance high impedance inductive reactance, and frequency determining elements comprising a resistor connected between a positive source of potential and said emitter, and a capacitor connected between said emitter and a negative source of potential, said two sources having a common point whereby the frequency of pulsation is determined substantially wholly by said frequency determining elements connected to the emitter and pulse amplitude limiting means having a non-linear characteristic connected to said crystal triode and to said frequency determining elements.

2. An oscillator as claimed in claim 1 and said means comprising a first diode connected to the emitter electrode of the said crystal triode so as to control the excursion positively of the said emitter to a predetermined negative level of potential, to inhibit oscillations of the said oscillator in the absence of other controls.

3. An oscillator as claimed in claim 2 and comprising a current limiting resistor in the collector circuit of the said crystal triode.

4. An oscillator as claimed in claim 2, and comprising a second diode connected to the said emitter so as to augment the back impedance of the said emitter.

5. An oscillator as claimed in claim 1, comprising means for synchronizing said oscillator to a triggering pulse source which has a frequency of pulsation approximately *n* times that of the natural frequency of pulsation of the said oscillator, and means applying said pulses as negative-going pulses to the base of the said crystal triode.

6. A frequency divider or counter comprising an arrangement of oscillators as claimed in claim 5 and coupled base-to-base via diodes suitably poled for the application or negative-going pulses to the base electrode of each stage in turn, whereby frequency division of an applied synchronising input at the first stage is effected, and output pulsations are obtainable at each triode stage in turn having a simple, integral frequency relationship with the applied synchronising input.

7. An oscillator as claimed in claim 3, and in which the said diode is connected to a point in the said emitter resistor connection, to allow positive excursions of the said emitter under suitable conditions of external control.

8. An oscillator as claimed in claim 7 adapted to receive synchronising pulsations via the said capacitor in the said emitter circuit and generated across a suitable resistor in said circuit, and to provide output pulses across the said resistor, or a part thereof, in the said collector circuit.

9. An oscillator as claimed in claim 8, and comprising a collector circuit output resistor in two portions, that portion adjacent to the collector being shunted by a capacitor, the other portion being the said output portion, whereby the form of the output pulses may be suitably modified in accordance with the joint time constant of the said capacitor and the said output resistor portion.

10. A frequency divider or counter comprising an arrangement of oscillators as claimed in claim 8 and coupled collector-to-emitter in each pair of stages, whereby frequency division of an applied synchronising input at the first stage is effected, and output pulsations are obtainable at each stage in turn having a simple, integral frequency relationship with the applied synchronising input.

11. A frequency divider or counter as claimed in claim 10, and comprising common input and output resistors between the several stages, and the said pulse-shaping capacitor applied to the final stage only.

References Cited in the file of this patent

UNITED STATES PATENTS

| | | |
|---|---|---|
| 2,620,448 | Wallace | Dec. 2, 1952 |
| 2,666,139 | Endres | Jan. 12, 1954 |
| 2,745,012 | Felker | May 8, 1956 |